United States Patent

[11] 3,571,512

[72] Inventor Alvaro Quiros
Springfield, Va.
[21] Appl. No. 816,142
[22] Filed Mar. 7, 1969
[45] Patented Mar. 16, 1971
[73] Assignee The Susquehanna Corporation
Fairfax, Va.
Continuation-in-part of application Ser. No. 789,842, Jan. 8, 1969, now abandoned.

[54] INTERRUPT CIRCUIT FOR USE IN A DUPLEX CONTROL CIRCUIT
11 Claims, 7 Drawing Figs.

[52] U.S. Cl. ........................................................ 178/58, 179/170.2, 325/5, 325/22, 325/57
[51] Int. Cl. ........................................................ H04l 5/16
[50] Field of Search ........................................................ 178/58, 59, 60; 325/5, 57, 341; 179/170.2, 170.6, 170.8

*Primary Examiner*—Kathleen H. Claffy
*Assistant Examiner*—David L. Stewart
*Attorney*—Martha L. Ross

ABSTRACT: The interrupt circuit is combined with a half-duplex repeater having a duplex control circuit. When an interrupt signal is received, the interrupt circuit, after the passage of a predetermined interval of time, overrides the control which the duplex control circuit is exercising on the passive repeater channel, and lets the interrupt signal through to terminate transmission in the communication system.

INVENTOR

ALVARO QUIROS

BY Tipton D. Jennings

ATTORNEY

INTERRUPT CIRCUIT FOR USE IN A DUPLEX CONTROL CIRCUIT

CROSS-REFERENCE TO RELATED APPLICATIONS

This application is a continuation-in-part of application Ser. No. 789,842 filed Jan. 8 1969, and now abandoned.

BACKGROUND OF THE INVENTION

The present invention relates to a circuit for interrupting the transmission of telecommunication signals and more particularly to an interrupting circuit for use in half-duplex, data transmission systems.

In a half-duplex coupling repeater having a duplex control circuit, the passive side or channel is prevented from carrying the signal transmitted through the active side back in the direction from which this signal was transmitted. This isolation between the active and passive channels is necessary in a half-duplex system to prevent a reflected signal from opening the transmission system and thus making it inoperative. Normally, in a telegraph or data pulse transmission system, it is the reflection or circulation of a Space pulse which causes this undesirable condition to occur, and the present specification will be described in this context in its illustrative embodiments.

It is sometimes necessary at a receiving station in a half-duplex system employing coupling repeaters to interrupt a transmitting station because of emergency priority conditions. However, the receiving station must break into the active transmissions by using a repeater channel which at that time, is the passive channel. Accordingly, if the active channel is sending a Space, then the passive side of the repeater will not operate to pass the break signal from the receiving station because it is prevented from doing so by the operation of the duplex control circuit. On the other hand, if the transmitter is sending a Mark at the time break-in is attempted by a remote station, there is a chance that it will be successful; however, with the transmission delays caused by propagation and equipment, there is no guarantee that the break signal will continue to encounter a Mark condition throughout its propagation to the transmitting station, and might, therefore, be blocked at some repeating point by the operation of that repeater's duplex control circuit. As a result, the chance of break-in succeeding is slight, even after repeated attempts and the need exists for means which will guarantee that a receiving station can interrupt a transmitting station.

SUMMARY

A particular object of the present invention is to provide, in combination with a half-duplex repeater having duplex control means, a circuit which permits a receiving station to interrupt a transmitting station successfully.

Another object of the present invention is to provide such a circuit which is effective to disable the control of the duplex control circuit on the passive side of the repeater, and thereby permit the interrupting signal to pass through the repeater.

Other objects and advantages will become apparent from a reading of this specification in become the accompanying drawings.

Briefly, the present invention is associated in combination with a half-duplex repeater having a duplex control circuit formed of two flip-flops, one flip-flop having an output line by which it controls one channel of the repeater and the other flip-flop having an output line by which it controls the other channel of the repeater, and during operation of the repeater one of said channels serving as the active channel and one as the passive channel. An interrupting circuit is provided for disabling the control of the passive repeater channel by the duplex control circuit in response to an interrupt signal, said interrupting circuit including a gate having an input responsive to the interrupt signal in at least one channel, delay means connected to the output of said gate for establishing a predetermined time-delay interval, and means responsive to said delay means for disabling the control of the passive channel by the duplex control circuit after the passage of said time-delay interval.

DESCRIPTION OF THE PREFERRED EMBODIMENTS

Figure 1:
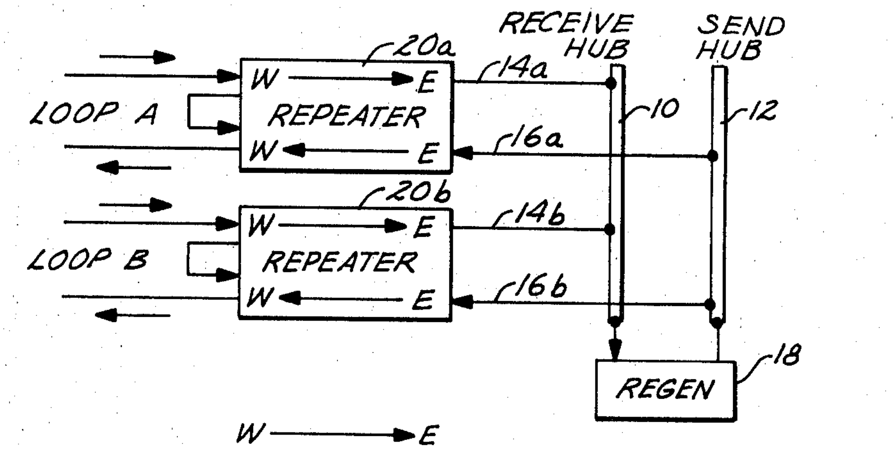
FIGS. 1 and 2 show, respectively, a block diagram of a hub circuit and a schematic of a half-duplex repeater which are included to aid in an understanding of the present invention.
Figure 2:
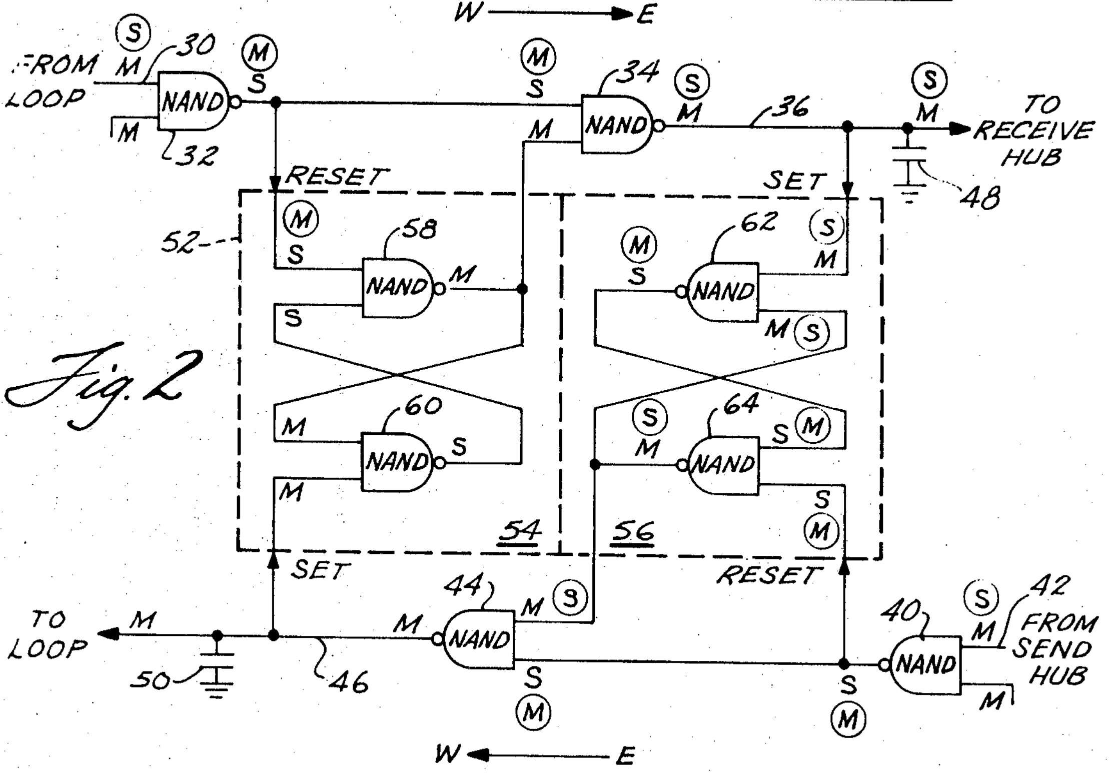
Figure 3:
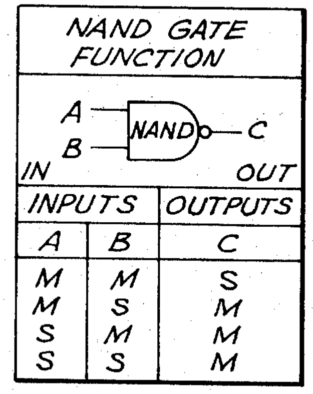
FIG. 3 is a truth table of NAND logic.

FIGS. 1—3 and the portion of the following specification describing these FIGS. have been extracted from U.S. Pat. application Ser. No. 715,403, filed Mar. 22 1968, which is assigned to the assignee of the present application. In FIG. 1 there is shown in block diagram form a telegraph system for connecting loop customers into a hub circuit, the purpose of this FIG. being to aid in the understanding of the invention, as later described. The hub circuit permits transmissions from one loop to be sent to all other loops connected into the hub, and also to any other hub circuits which may be connected to this hub.

The hub consists of a receive hub conductor 10 and a send hub conductor 12. Each receive leg or channel 14 is connected to the receive hub 10, and each send leg or channel 16 is connected to the send hub 12.

A conventional regenerative repeater 18 is connected between the receive and send hubs. This regenerative repeater reshapes the pulse trains applied by the receive hub 10 and retransmits the pulse train in undistorted form onto the send hub 12. Because of the operation of the regenerative repeat, the regenerated pulse train is customarily delayed one-half of a unit pulse length with respect to the input pulse train.

Connected between the hub circuit and each of a plurality of loops, two of which are shown here, are repeaters 20. The purpose of these repeaters, by way of illustration, is to isolate the loops from the hub circuit or to convert the current or voltage levels between the loops and the hub circuit.

The system shown in FIG. 1 is designed for half-duplex operation in which only one loop can send (transmit) at any one time while the rest of the loops receive. For example, if loop A is transmitting, the generated pulse train is applied into the West-to-East (W/E) leg of repeater **20*a*. Line 14*a* applies to the output of repeater 20*a*, which is a repeated form of the input, to receive hub 10. This pulse train goes to regenerative repeater 18 where it is reshaped and applied onto send hub 12**.

From the send hub 12 this pulse train is applied to each leg 16 and thereby to the East-to-West (E/W) leg of each repeater 20. Except for loop A, each of the remaining loops such as loop B will now apply a repeated pulse train from the output of the E/W leg of its repeater 20 into its associated loop where it will be received by each customer in the loop.

The operation of FIG. 1 on a pulse-by-pulse basis is that if a loop is idle or in a Marking pulse condition, the loop is completely closed and a predetermined current level exists in the loop. This current level also appears at the West input of the W/E leg of each repeater 20. A predetermined voltage level, corresponding also to a Marking or idle condition appears at each line 14, receive hub 10, send hub 12, and each line 16.

When any loop goes Spacing, the loop is either opened or a new current level is provided. Assuming here that loop A is broken, the absence of current is applied to the W/E input of repeater **20*a*. A new voltage level appears on line 14*a*, received hub 10, send hub 12 (after a one-half pulse delay) and each line 16**. In loop B and in all other loops tied into the hub circuit, except for loop A, a Spacing condition is transmitted by the E/W repeater into the loop. The customers in these loops will receive a Spacing pulse condition.

In loop A, with reference to the aforedescribed example, if a Spacing condition is allowed to propagate from the send hub 12 through the E/W leg of repeater 20*a* back into the loop, an open condition will exist which remains even though the transmitter (not shown) in loop A is subsequently closed to terminate the Spacing pulse. Thus, loop A remains open or Spacing and this condition will hold the other loops also open via the hub circuit connection, resulting in a inoperative telegraph system.

Likewise, if loop A is transmitting a Space which is propagated to the other loops such as loop B, this Spacing or open signal can propagate through loop B and be applied to the West side of the W/E leg of repeater 20*b*. If this Space is allowed to be reflected through the W/E leg into the receive hub 10, it will also appear on the send hub 12 after passing through regenerator 18 and be applied to the other loops, including loop A once that loop returns to the Marking condition. The result will again be an inoperative telegraph system because the entire circuit will be in an open condition. Control circuitry is necessary to prevent reflection or retransmission of Spacing signals back through one leg when the opposite leg is actively transmitting, particularly where any delays occur in signal propagation. To accomplish this end, a double duplex control circuit for use in a half-duplex system is next described.

In FIG. 2 there is shown the construction of a repeater 20 having W/E and E/W channels. The conventional interface circuitry which is connected between the repeater, as shown in this FIG., and the loop and hub, has been omitted. NAND logic is used in this preferred embodiment, although it is to be understood that other logic forms can be utilized.

In the W/E channel, the input from the loop is applied by line 30 to NAND gate 32. The second input to this NAND gate is connected to a Marking (M) level, and NAND gate 32 functions as an inverter. The output of NAND gate 32 is connected to the input to NAND gate 34. The output of NAND gate 34 is applied by line 36 to the receive hub. When this W/E channel is active and transmissions are applied to inverter 32, the input pulses applied on line 30 are repeated on output line 36.

The E/W channel is the same in construction and operation as the W/E channel and includes an inverter 40 connected to receive an input from the send hub via line 42. The second input of this inverter is connected to a Marking level. The output of inverter 40 is connected to the input of NAND gate 44 whose output, in turn, is applied by line 46 towards the loop. Capacitors 48 and 50 are connected respectively to output lines 36 and 46.

The duplex control circuit 52 contains two bistable circuits which are shown as logic flip-flops 54 and 56. In flip-flop 54, the Set input is connected from line 46 in the E/W channel, and the Reset input is connected from the output of inverter 32 in the W/E channel. Flip-flop 54 is formed of two NAND gates 58 and 60, connected as a conventional SR flip-flop. The output of flip-flop 54 is taken from the output of NAND gate 58 and applied to the second input of NAND gate 34 in the W/E channel.

Flip-flop 56 is also constructed as a conventional SR flip-flop having two NAND gates 62 and 64. The Set input is connected from output line 36 in the W/E channel and the Reset input is connected from the output of inverter 40 in the E/W channel. The output of flip-flop 56 is taken from the output of NAND gate 64 and applied to the second input of NAND gate 44 in the E/W channel.

Both the W/E and E/W channels operate identically and only an explanation of one direction of transmission is necessary to obtain an understanding of how the duplex control circuit 52 operates to prevent reflection or retransmission of Spacing signals through an inactive channel. To assist in an understanding of the operation of the NAND gates in response to Mark and Space inputs, a truth table is shown in FIG. 3. As shown, a Space at either input causes a Mark at the output. If two Marks are present at the input, a Space occurs at the output.

Assume the the W/E channel is actively transmitting. The duplex control circuit 52 now functions to keep the output of the E/W channel Marking even under those conditions where a delay of one-half of a unit pulse or more occurs between the time a pulse transition leaves on line 36 and circulates to inverter 40 in the E/W channel. Initially, when both channels are idle (or Marking), the signal conditions throughout the circuit are shown in FIG. 2 by an uncircled M for Marking and an uncircled S for Spacing. Flip-flops 54 and 56 are in the Reset state.

When a Spacing pulse is received by inverter 32, its output goes Marking. (Note that a circled M and a circled S are used to show the changes in signal condition throughout the circuit in response to a Spacing signal at the West input.) At NAND gate through two Marking inputs are present and the output of this gate goes Spacing. A Spacing signal is now sent out to the receive hub. The Marking output of inverter 32 is also applied to NAND gate 58 in flip-flop 54; however, the second input to this gate remains Spacing and its output stays Marking. Therefore, the change in signal in the loop and thereby in the W/E channel has no effect on flip-flop 54 in duplex control circuit 52.

With the W/E repeater channel active, flip-flop 56 becomes activated to lock the output of the inactive E/W repeater channel in a Marking or closed-contact state. This control begins by the application of the Spacing signal on line 36 to the Set input of flip-flop 56 which changes the output of NAND gate 62 from Space to Mark. One input to NAND gate 64 now becomes a Mark.

After the Spacing signal circulates through the hub circuit including the regenerative repeater 18 shown in FIG. 1, it arrives on line 42 and is applied to inverter 40. The output of this inverter goes to Mark which is applied both to NAND gate 44 and to flip-flop 56. In NAND gate 64 of this flip-flop, two Marking inputs are not present and its output goes Spacing. This Spacing signal is applied to NAND gate 62, where it has no effect, and to NAND gate 44. Because at least one of the inputs to NAND gate 44 is a Space, even though the signals at each input have just been reversed, the output of the E/W channel on line 46 remains locked at Mark.

For a very brief propagation interval of approximately 25 nanoseconds which it took for the Mark signal to activate NAND gate 64 and apply a Space to the upper input of NAND gate 44, there were two Marking signals present at the input of NAND gate 44. Under such conditions its output would normally change to a Space. However, at this time, capacitor 50 operates in conjunction with circuit resistance in gate 44 to prevent line 56 from going Spacing, and a continuous Marking signal remains. No adverse effect occurs in the loop.

When the Spacing signal terminates in the loop and the input on line 30 returns to a Mark, the output on line 36 also goes Marking. This Marking signal is applied to flip-flop 56 but it has no effect on NAND gate 62 because its second input is Spacing. This memory feature of the duplex control circuit is significant because were flip-flop 56 now to Reset, NAND gate 44 would switch to a Spacing output because a Spacing condition still exists at the input to the E/W channel. Therefore, it is not until the Marking signal on line 36 has circulated to the E/W repeater, accompanied by any of the aforedescribed delays, that flip-flop 56 can possibly Reset. This Resetting occurs as follows: when the output of inverter 40 ultimately goes Spacing, it applies this signal to NAND gate 44 thereby holding the output of the E/W channel at the desired Marking condition. This Spacing signal from inverter 40 is also applied to the Reset input of flip-flop 56 and changes the output of NAND gate 64 back to Mark. Because the lower input of NAND gate 44 has already returned to Space, the Resetting of this flip-flop cannot affect the output of NAND gate 44 which remains Marking.

The Marking output of NAND gate 64 is also applied to the input of NAND gate 62 changing its output back to a Spacing signal. The circuit of FIG. 2 is now back in its original state where the uncircled letters M and S represent the signal conditions.

If the E/W channel were to become the active repeater, flip-flop 54 in control circuit 52 would be activated, in the same manner as just described for flip-flop 56, to prevent any feedback or reflection through the loop and back to the hub circuit. Again the memory feature of this control circuit comes into play to prevent any premature release of the lock on the W/E channel until the Spacing signal has terminated at input line 30 connected to inverter 32. Thus, this control circuit 52 can isolate the inactive channel regardless of the direction of transmission and even though significant delays exist in the signal propagation.

As mentioned previously, it is sometimes necessary for a receiving station to interrupt a transmitting or sending station for various reasons such as the occurrence of an emergency or priority condition. This is accomplished by sending a long Spacing signal, hereinafter referred to as a "Space-break," into the system. When this signal is received at the various stations (not shown) in the system, an open-alarn is sounded. At the sending station, the sender will cease to transmit and close his line, permitting the station which sent the Space-break signal to now transmit.

However, there is a problem encountered in propagating the Space-break to the transmitting station. This can be best demonstrated by again referring to FIG. 2. If the active transmitter is sending a Space in the W/E direction at the time the Space-break signal arrives from the send hub on line 42, NAND gate 44 in the repeater will be found under the control of flip-flop 56 and the Space-break signal cannot get through. As a result, line 46 remains Marking, and the transmitter is never made aware of the existence of the Space-break signal in the hub. Thus, the transmitter continues broadcasting even if no one in the hub can receive. Furthermore, the subsequent transmission of a Mark by the W/E repeater channel into the hub circuit will not be effective to Reset flip-flop 56 because line 42 is held Spacing by the Space-break signal and the necessary Mark-to-Space Reset signal cannot appear at the output of gate 40. If the transmitting station is sending a Mark pulse when a Space-break signal is generated at a receiving station, this Space-break will pass through to the transmitting station if such station is still Marking when this signal arrives at the repeater; however, because of normal propagation delays, plus the delay caused by equipment such as regenerative repeater 18 (FIG. 1), the likelihood exists that the transmitting station is Spacing when the Space-break arrives at the repeater. As a consequence, the Space-break signal does not get through because of the action of the duplex control circuit.

In actual practice, it has proven most difficult for a receiving station to break-in even after several attempts, and the need exists for means which will guarantee that a receiving station can interrupt a transmitting station.

Figure 4:
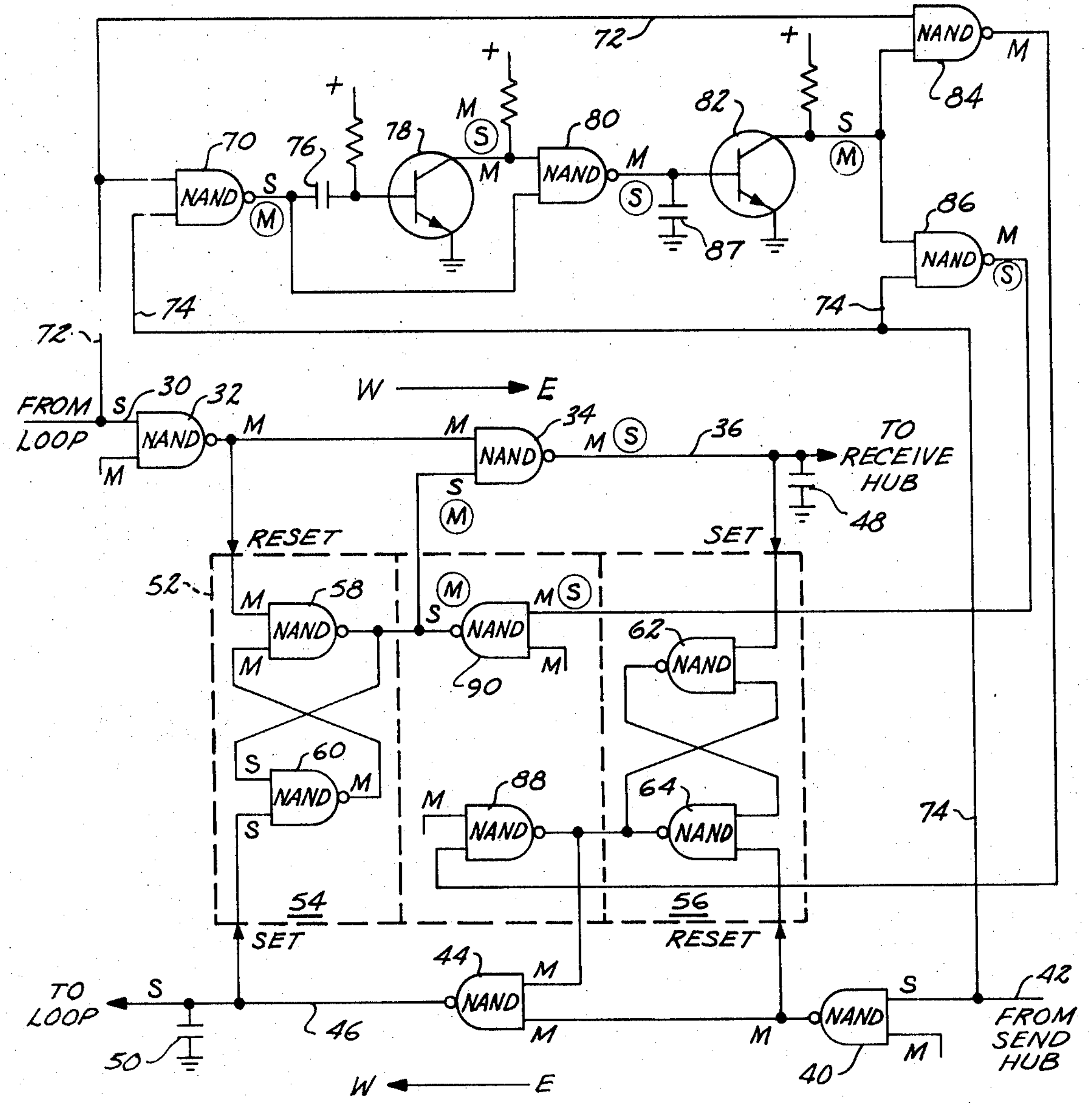
FIG. 4 is a schematic showing of the preferred embodiment of the present invention.
Figure 5:
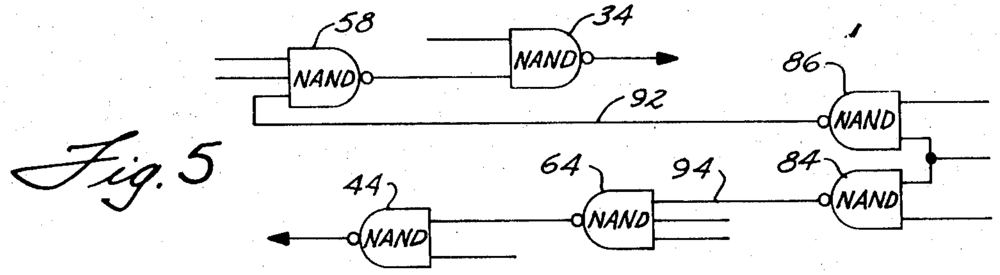
FIG. 5 is a modification of FIG. 4.

In FIG. 4 there is shown one preferred embodiment of the present invention. The repeater and duplex control circuit are again presented, including the numerals used in connected with FIG. 2.

An interrupting circuit has at its input a NAND gate 70 having two input lines 72 and 74. Line 72 is shown here connected to the input line from the loop and line 74 to the input line from the hub circuit. The output of gate 70 is connected to capacitor 76, which is in turn connected to inverting transistor 78. The output of transistor 78 and the output of NAND gate 70 are both applied to NAND gate 80.

A second inverting transistor 82 is connected to the output of NAND gate 80. The output of transistor 82 is applied to two more NAND gates, 84 and 86. Second inputs to these two NAND gates are obtained on lines 72 and 74, respectively. A small filtering capacitor 87 and bias sources are also shown.

The control circuit 52 is modified to include two additional NAND gates 88 and 90, which receive, respectively, inputs from NAND gates 84 and 86. The output of NAND gate 90 is connected to the output line of flip-flop 54, on which control signals are applied to the W/E channel. Similarly, the output of NAND gate 88 is connected to the output line of flip-flop 56, on which control signals are applied to the E/W channel. NAND gates 88 and 90 function as inverters.

For the following description of operation of FIG. 4, assume that the active transmissions are in the E/W channel, and that a Space has been transmitted by an active station and has arrived on line 42. The uncircled letters show the signal condition at pertinent points in the repeater. At the output of gate 40, there is a Mark, and on a line 46 appears a Space which is transmitted through the loop. Thus, a Space is also present at the input of NAND gate 32, and a Mark at its output, Flip-flop 54 is in a Set state, placing a Space on one input of NAND GATE 34 to hold its output at Marking, thereby preventing the passage of a Space from the loop.

If a Space-break is now generated in the loop, it can not pass through the W/E repeater channel because it is blocked at NAND gate 34 the same as would be any Spacing pulse. Even when the hub input subsequently goes to Mark during the pulse code transmissions, the Space-break signal, which is still present at the loop input to the repeater, does not get through because flip-flop 54 is not Reset.

However, this Space-break signal is also applied to the interrupt circuit on line 72. This Spacing condition causes NAND gate 70 to go Marking and capacitor 76 begins to discharge. The output of transistor 78 goes Spacing during the discharge time of capacitor 76. For the present description, assume a discharge time of 500 ms. After the passage of 500 ms., capacitor 76 has discharged to a point where transistor 78 conducts and its output goes Marking. There are then two Marks at the input of NAND gate 80 and its output becomes a Space, which is inverted to a Mark by transistor 82.

At NAND gate 84, there is no change because the Space-break is present at its second input. At NAND gate 86, however, the second input is found to be provided by line 74 which is connected to input line 42. The transmitting station is still actively transmitting at this time and a Mark is either present on line 42, and thus on line 74, or soon appears. Thus, two input Marks occur at NAND gate 86 and its output goes to Space.

The Space from NAND gate 86 is applied to NAND gate 90 which inverts it to a Mark. This Mark signal clamps the output line of flip-flop 54 to the Mark potential and therefore effectively disables the control of control circuit 52 on the W/E channel. As seen, two Marks now appear at the inputs of NAND gate 34 and its output goes to Space. Thus, the Space-break signal has succeeded in passing through the repeater and can now propagate out into the transmission system.

When this Space reaches the hub circuit, it puts the hub in a Space condition, and the result is that all of the repeaters connected to the hub now have a Spacing signal at their input.

If the transmitting station is sending a Mark when the Space-break signal reaches the repeater connected to this station, the Space-break passes through to the transmitting station to terminate transmission. If the Space-break signal arrives when a Space is being transmitted, the Space-break signal arrives when a Space is being transmitted, the Space-break cannot pass NAND gate 44 in that repeater because its flip-flop 56 is Set. Nevertheless, the Space-break activates the interrupt circuit associated with that repeater. After about 500 ms., NAND gate 84 in that circuit goes Spacing by the same sequence of operation just described. This Space causes a Mark at the output of NAND gate 88 which opens up the lower channel and lets the Space-break pass into the transmitting loop.

Thus, after only a brief time, as may be required to allow for the operation of several 500 ms. timing periods, the Space-break signal has successfully passed from its originating station and penetrated into the transmitting loop to interrupt the active transmitter. If desired, this interruption can be done automatically by circumventing the transmitter and placing the line in an idle condition. Normally, however, the interruption is by an alarm or similar signal which informs the operator to terminate transmission. He then places his transmitter in idle (Marking) condition, and the system is now available for transmission of the emergency or priority message.

An alternative modification of control circuit 52 to accommodate the output of the interrupting circuit is shown in FIG.

5. In this FIG. NAND gates 88 and 90 have been omitted, and instead NAND gates 58 and 64 have been modified to include a third input line. NAND gate 58 is connected to the output of NAND gate 86 in the interrupting circuit by a third line 92. NAND gate 64 is connected to the output of NAND gate 84 by third line 94. The output of NAND gate 58 is again connected to one input of NAND gate 34 and the output of NAND gate 64 is connected to one input of NAND gate 44. The remainder of the repeater, control circuit, and interrupt circuit is identical to that of FIG. 4 and is not duplicated here.

As described in FIG. 4 the outputs of the interrupt circuit are normally in a Marking condition. Thus both of the lines 92 and 94 are normally Marking and no effect on the control circuit is realized by the interrupt circuit. When a Space-break signal causes the output of one of the NAND gates 84 or 86 to go Spacing, this condition is effective to disable the control exerted by the duplex control circuit over the passive repeater channel.

For example, assume as described in FIG. 4 that a Space-break signal has caused the output of NAND gate 86 to go Spacing after the passage of the aforedescribed 500 ms. timing period. This Space condition is applied by line 92 to the input of NAND gate 58 and its output goes from Space to Mark. Two Marks now appear at the input to NAND gate 34 and its output goes to Space. Because NAND gate 34 is, in this example, in the passive channel of the repeater, the Space-break signal has succeeded in passing through the repeater and can now propagate out into the transmission system.

The discharge time of capacitor 76 is selected to be substantially greater than the longest Spacing signal that is encountered in normal telegraph transmission. The reason is that the input lines 72 and 74 of NAND gate 70 are connected into the transmission system, and the output of NAND gate 70 goes from Space to Mark any time a Space appears in the loop or hub circuits causing discharge of capacitor 76 to begin. But no output will be generated by the interrupt circuit if the discharge time is longer than the duration of the longest Space condition, plus the propagation time and delays normally encountered. Once a normal Spacing condition terminates, capacitor 76 will recharge to full voltage.

There are certain telegraph and data transmission systems where the transmission of a lengthy Space-break signal is either undesirable or impossible; yet, the need for an interrupting capability exists. One example is where a computer is positioned in one loop to communicate with all of the other loops. The construction of the computer makes it essentially impossible to transmit signals other than those normally used in data transmission.

It has been proposed to utilize a "Blank" character as the interrupt or Space-break signal in these situations. A Blank character is one in which the information bits are all Spaces, i.e., the character format consists of a start-pulse (Space) followed by five to eight additional Spacing bits or pulses and terminates with a stop-pulse or pulses (Mark).

The problem presented by the use of a Blank character as an interrupt signal is that it is a valid character routinely used in data transmission. Should a Blank character be used as the interrupt signal in the embodiment of FIG. 4, and the discharge time of capacitor 76 reduced to accommodate the use of this new interrupt signal, the interrupt circuit will not be able to distinguish between valid Blank characters and Blank characters intended as interrupt signals. The interrupt circuit would respond to each Blank character which is transmitted through the system and its timing circuit would time out before this Blank character ended permitting it to pass through the passive channel of the repeater. As a result, the system would in all probability be opened each time a Blank character was transmitted, preventing further transmissions through the system.

Therefore, there is a need for an interrupt circuit which is not caused to operate by a valid character but does respond to this same character where it is intended as an interrupt signal so that this interrupt signal can successfully pass through the half-duplex repeater to perform its interrupting function. This is accomplished by the interrupt circuit shown in FIG. 6.

Figures 6, 7:
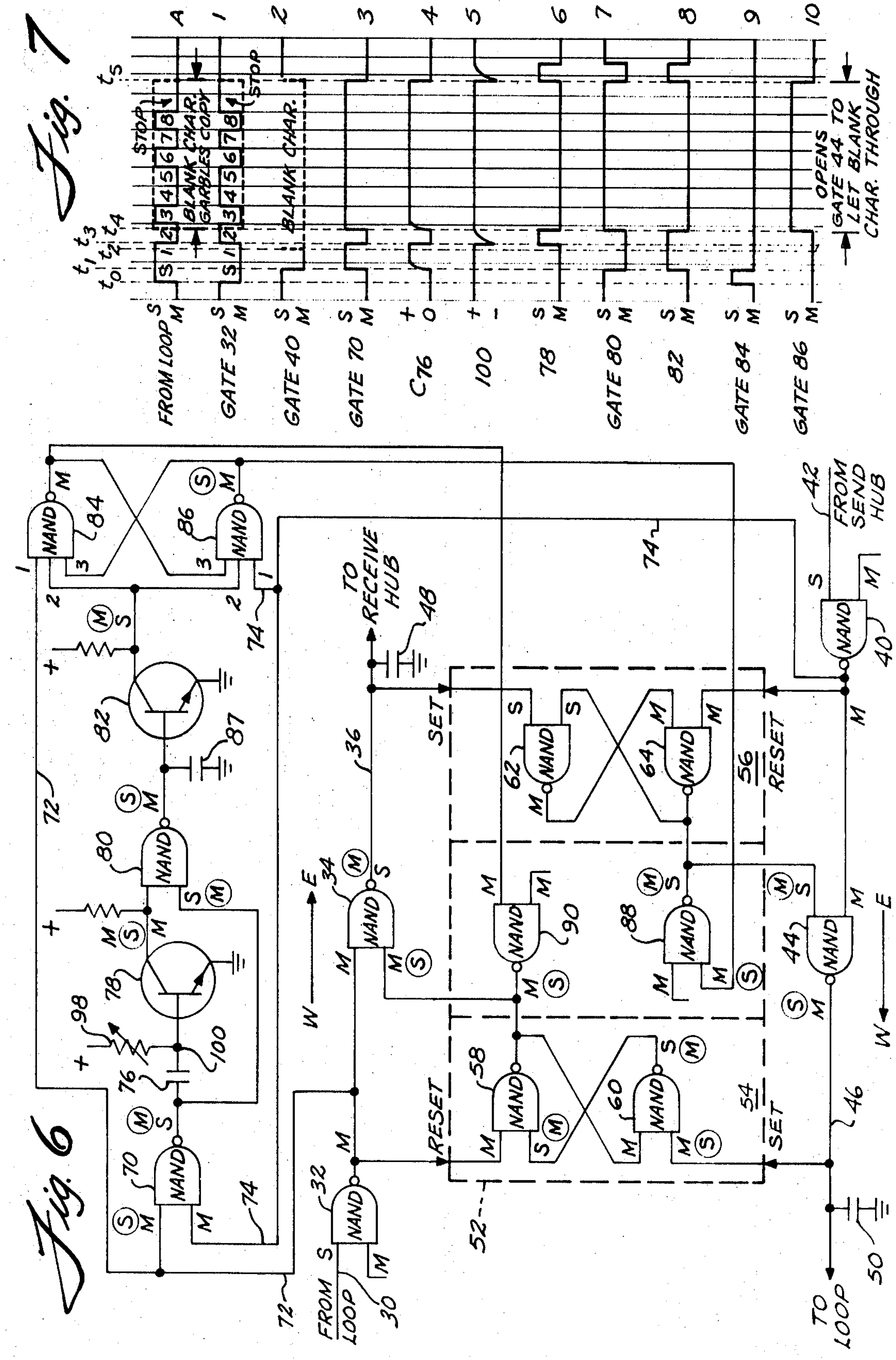
FIG. 6 is a schematic showing of a second preferred embodiment of the present invention.
FIG. 7 shows timing diagrams which aid in an understanding of the embodiment of FIG. 6.

FIG. 6 is essentially identical in construction to the circuit of FIG. 4, and the same numerals have been used throughout to identify the same components. The input lines 72 and 74 of the interrupt circuit are not connected, telegraph to the outputs rather than the inputs of inverters 32 and 40, which are shown as NAND gates in the drawing. Within the interrupt circuit, the output NAND gates 84 and 86 have a latching arrangement; that is, the output of each NAND gate is connected to the input of the other. The inputs of these NAND gates have been labeled 1, 2 and 3 for ease of description. Note that the output of NAND gate 84 is now connected to the input of NAND gate 90, and the output of NAND gate 86 to the input of NAND gate 88.

The discharge time of the RC circuit including capacitor 76 and resistor 98 has been reduced to less than the duration of one full bit but greater than one-half bit at the transmission speed of the data or telegraph signals being transmitted in the system. For this reason the resistor 98 in the RC circuit has been made variable; however, this is not a necessity. The interrupt circuit can handle a variety of speeds without varying the resistance value. In such case, it is only necessary to set the discharge time for the lowest speed encountered. This would mean, of course, that for higher speeds the delay may be greater than one full bit, but this will not have adverse results on the functioning of the interrupt circuit because only two Marks in a row would then need to occur to let the interrupt circuit function successfully to allow the interrupt signal to pass trough the repeater.

As described previously in connection with FIG. 4, if either channel is transmitting a Mark when an interrupt signal, which is a Spacing signal, arrives at the opposite channel, it will pass through the repeater. The problem, therefore, occurs in attempting to pass the interrupting signal through the passive channel of the repeater when the active channel is sending a Space.

For the following description of operation of FIG. 6, assume that the active transmissions are in the W/E channel and that a Space has been transmitted by the loop, has passed through the repeater, has returned from the send hub by line 42 and applied to the E/W channel. The uncircled letters again show the signal condition at pertinent points in the repeater. Note that flip-flop 56 of the duplex-control circuit 52 is Set and is applying a Space to one input of NAND gate 44. Therefore, the output of gate 44, and thereby line 46, is a Mark and the Space which has returned on line 42 is prevented from circulating back into the loop.

With Spacing levels present at both inputs to the repeater, Marks appear at the outputs of NAND gates 32 and 40 and are applied by lines 72 and 74, respectively, to the inputs of NAND gate 70 in the interrupt circuit. The output of gate 70 is a Space. Capacitor 76 charges from the positive source (not shown) of NAND gate 70 through the base-to-emitter path of transistor 78. NAND gate 80 has its output at MARk because one input is a Spacing condition. Accordingly, the output of inverter 82 is a Space which is applied to input No. 2 of NAND gates 84 and 86. The output of each of these NAND gates is a Mark, but this signal has no effect on either NAND gate 88 or 90.

During the ensuing description of operation, reference should also be made to the waveforms shown in FIG. 7. In line A, there is shown the eight-level sample character which is intended to be transmitted by the loop through the W/E channel of the repeater and to the receive hub. Line 1 shows this character as it appears at the output of NAND gate 32 in the W/E channel and therefore is actually an inverted representation of the character. Line 2 also shows this character inverted at the output of NAND gate 40 in the E/W channel. Absent the forthcoming Blank character, line 2 repeats the character shown on line 1 with slightly over a one-half bit delay caused by the regenerative repeater (FIG. 1) and normal transmission delays.

Reviewing briefly with reference to FIG. 7 the signal conditions which have occurred at selected points in the circuit of FIG. 6: in line 1, the output of gate 32 went Marking at time $t_0$; line 2 went Marking at time $t_1$ after the regeneration and transmission delays; the output of NAND gate 70 in the interrupt circuit went Spacing at $t_1$ (line 3); capacitor 76 quickly charged at $t_1$ (line 4); point 100, at the junction of capacitor 76 and resistor 98, is stabilized at some slightly positive potential (line 5); the output of transistor 78 is Marking (line 6); the output of gate 80 went Marking at $t_1$ (line 7); the output of inverter 82 went Spacing at $t_1$ (line 8); the output of gate 84 shown on line 9 is Marking, having gone briefly to a Spacing condition from $t_0$ to $t_1$ which had no effect on the W/E channel and the output of gate 86 is Marking (line 10).

At this time, assume that a customer in another loop in the system wants to break into the transmissions being sent by the active transmitter and transmits a Blank character. This character goes through the hub circuits (FIG. 1) and places this portion of the system in a Spacing condition. It then arrives on line 42 at time $t_2$ but cannot pass through the repeater because the active channel is transmitting a Space. However, this Blank character remains on line 42 and keeps the output of gate 40 in a Marking condition. This is shown in line 2 of FIG. 7.

At the end of the first information bit the active transmitter goes Marking (time $t_3$) and the output of NAND gate 32 goes Spacing. This Space is applied by line 72 to NAND gate 70 in the interrupt circuit and its output goes Marking. This, in effect, puts the left side of capacitor 76 at ground (line 4) and the right side of capacitor 76 drops to a negative potential as represented by junction point 100 in line 5 of FIG. 7. This capacitor now begins its discharge through the resistor 98. During this discharge time, transistor 78 is off and its output is at a Spacing condition. However, the output of NAND gate 80 is held Marking by the presence of the Spacing input provided by gate 70 and no change is experienced by the rest of the interrupt circuit.

During the second information bit, the RC timing circuit formed by capacitor 76 and resistor 98 times out at time $t_4$ and transistor 78 conducts. Its output goes Marking. There are now two Marks at the input to NAND gate 80, and its output goes Spacing as shown in line 7 of FIG. 7. This Space is inverted by transistor 82 to a Mark (line 8). At NAND gate 84, a Space is provided by line 72 to input No. 1 and its output stays Marking.

At NAND gate 86 there are now three Marking inputs. One is provided by the output of NAND gate 84, one is provided by the output of inverter 82, and the third is provided by the Blank character via line 74. The simultaneous presence of three Marking inputs causes the output of NAND gate 86 to go Spacing. This space is applied to NAND gate 88 which inverts it to a Mark. This Mark signal clamps the output line of flip-flop 56 to the Mark potential and, as shown, two Marks now appear at the inputs of NAND gate 44. The output of this gate, and thereby line 46, goes to Space. The control exercised by control circuit 52 on the E/W channel has been disabled and the Blank character which serves as the interrupting signal has succeeded in passing through the repeater and now can propagate through the loop. As shown in line 10 of FIG. 7, gate 44 remains open until the Blank character terminates at time $t_5$.

The Blank character which is now in the loop overrides the transmissions of the active transmitter and places its output in a Spacing condition (See line A of FIG. 7). The teleprinter, which is associated with the transmitting station and types out its own transmissions, will have one of its characters misprinted or "garbled," although it is possible two characters might be misprinted depending upon when the blank character enters the loop. If necessary, the customer who is attempting to interrupt can send several blank characters in a row, the result being that enough printed copy will be garbled at the teleprinter of the transmitting customer to inform him that someone is attempting to break through and that he should terminate his transmissions.

When the Blank character broke through onto line 46, it set flip-flop 54 so that after the character circulated to NAND gate 32 and its output went Marking, the output of NAND gate 58, and accordingly the lower input to NAND gate 34 was placed at a Spacing condition. This held the output of NAND gate 34 Marking. The Marking output of gate 32 is also applied to NAND gate 84 in the interrupt circuit but has no effect, because the output of NAND gate 86 has latched input No. 3 of gate 84 to a Space and its output is held Marking. Thus, gate 84 cannot affect gate 90 and as a consequence cannot enable NAND gate 34. The output of this last gate, which serves at the output of the W/E repeater channel, stays Marking.

Normal transmissions of a Blank character do not affect the interrupt circuit shown in FIG. 6. Although the capacitor 76 will charge when the Blank character appears at inputs of both channels of the repeater, discharge of this capacitor does not begin until the character terminates in the active channel. However, by the time this capacitor times out, the Blank character will have ended at the passive channel input because the time necessary for the stop pulse (Marking) to circulate through the hub circuitry is less than the discharge time of the capacitor. Therefore, neither of the NAND gates 84 or 86 has the required coincidence of three identical input signals.

Occasionally, the resistor 98 may be set for a low transmission speed but the signals which are received are of a much higher speed such that the discharge time of capacitor 76 exceeds the duration of one full bit or pulse. This will not have an adverse affect on the functioning of the interrupt circuit because only two successive Marks would then be needed to permit the interrupt circuit to function successfully. For example, in the sample character shown in line A of FIG. 7, had the third information bit arrived before capacitor 100 timed out, two Marking signals would have again been present at the input to NAND gate 70. Its output would have again been placed at a Spacing level which would have held the output of NAND gate 80 at a Marking level. No change would have been experienced in the remainder of the interrupt circuit.

In the sample character shown, two consecutive Marks appear at the fourth and fifth information bits. The arrival of the fourth bit would have caused the recharged capacitor 76 to begin again its discharge. Although this capacitor would not have completed its discharge until the character was in its fifth information bit, the fact that this fifth bit is also a Mark keeps the output of NAND gate 32 Spacing and the output of NAND gate 70 Marking. Thus, when capacitor 76 times out, the remainder of the interrupt circuit can function as previously described to let the Blank character pass through gate 44 into the loop. At least one character at the teleprinter of the active transmitter would be garbled. Therefore, if the customer who is attempting to interrupt again sends several Blank characters in a row, sufficient errors will be printed at the teleprinter of the transmitting customer to inform him that someone is attempting to break through and that he should terminate his transmissions.

I claim:

1. In a half-duplex repeater having a duplex control circuit formed of two flip-flops, one flip-flop having an output line by which it controls one channel of the repeater and the other flip-flop having an output line by which it controls the other channel of the repeater, and during operation of the repeater one of said channels serving as the active channel and one as the passive channel, the improvement comprising an interrupting circuit for disabling the control of the passive repeater channel by the duplex control circuit in response to an interrupt signal, said interrupting circuit including an input circuit having at least one input designed to be responsive to an interrupt signal in one of said channels, delay means connected to the output of said input circuit for establishing a predetermined time-delay interval, and means responsive to said delay means for disabling the control of the passive channel by the duplex control circuit after the passage of said time-delay interval.

2. In a half-duplex repeater as claimed in claim 1, said input circuit comprising a gate having two inputs, each input designed to be responsive to an interrupt signal on a separate one of said channels.

3. In a half-duplex repeater as claimed in claim 2, said delay means including a timing capacitor, said timing capacitor being controlled by the output of said gate to begin the time-delay interval in response to receipt of an interrupt signal on either channel.

4. In a half-duplex repeater as claimed in claim 3, said disabling means including clamping means connected to the output line of each flip-flop, said clamping means placing the output line of the flip-flop which is controlling the passive repeater channel at a potential level which effectively disables the control of that flip-flop over the passive channel and thereby permits an interrupt signal to pass through the passive channel.

5. In a half-duplex repeater as claimed in claim 4, said disabling means further including two output gates each having two inputs and one output, one input of both output gates being responsive to the output of said delay means, and the other input of each output gate designed to be responsive to the signal condition on a separate one of said channels, and the output of each gate connected to said clamping means.

6. In a half-duplex repeater as claimed in claim 3, said disabling means including two output gates each having two inputs and one output, one input of both output gates being responsive to the output of said delay means, and the other input of each output gate designed to be responsive to the signal condition on a separate one of said channels, the output of one output gate being connected to one of said flip-flops, and the output of the other output gate connected to the other flip-flop.

7. In a half-duplex repeater having a duplex control circuit formed of two flip-flops, one flip-flop having an output line by which it controls one channel of the repeater and the other flip-flop having an output line by which it controls the other channel of the repeater, and during operation of the repeater one of said channels serving as the active channel and one as the passive channel, the improvement comprising an interrupting circuit for disabling the control of the passive repeater channel by the duplex control circuit, said interrupting circuit including a first NAND gate having two inputs, one of said inputs being connected into one repeater channel and the other of said inputs being connected into the other repeater channel, a timing capacitor connected to the output of said NAND gate for establishing a predetermined time-delay interval, a switching transistor connected to said capacitor and having its conducting state responsive to the charge on said capacitor, a second NAND gate having two inputs, one input being connected to the output of said switching transistor and the other input being connected to the output of said first NAND gate, a second switching transistor connected to the output of said second NAND gate, third and fourth NAND gates, each having two inputs, one input of each of said third and fourth NAND gates being connected to the output of said switching transistor, the other input of said third NAND gate being connected to one repeater channel, the other input of said fourth NAND gate being connected to the other repeater channel, a first inverter connected to the output of said third NAND gate and having an output connected to the output line of one flip-flop, a second inverter connected to the output of said fourth NAND gate and having an output connected to the output line of the other flip-flop.

8. In a half-duplex repeater including a duplex control circuit having a first output line by which it controls one channel of the repeater and a second output line by which it controls the other channel of the repeater, and during operation of the repeater one of said channels serves at the active channel and one as the passive channel, the improvement comprising an interrupting circuit which in response to an interrupt signal disables the control of the duplex control circuit on the passive repeater channel to let said interrupt signal pass through said passive repeater channel, said interrupting circuit including an input gate having two input lines, one line being connected into one repeater channel and the other line being connected into the other repeater channel, delay means connected to the output of said gate for establishing a predetermined time-delay interval, said delay means being conditioned to begin the time-delay interval by the appearance of two identical signal levels at the inputs of said gate and thereafter beginning said time-delay interval when one of said signal levels terminates, and means responsive both to said delay means and to the signal in the passive channel for disabling the control of the duplex control circuit on the passive channel at the end of said time-delay interval when the signal in said passive channel is of the same level as caused said delay means to be conditioned.

9. In a half-duplex repeater as claimed in claim 8, said delay means including a timing capacitor, said capacitor being charged by the appearance of two identical signal levels at the inputs of said gate and thereafter beginning its discharge and the time-delay interval when one of said signal levels terminates.

10. In a half-duplex repeater as claimed in claim 9, said duplex control circuit having two flip-flops, said first output line being connected to the output of one flip-flop, and the second output line being connected to the output of the other flip-flop, and said disabling means including clamping means connected to the output line of each flip-flop, said clamping means placing the output line of the flip-flop which is controlling the passive repeater channel at a potential level which effectively disables the control of the flip-flop on the passive channel at the end of said time-delay interval.

11. In a half-duplex repeater as claimed in claim 10, said disabling means further including two output gates each having three inputs and one output, one input of both output gates being connected to be responsive to the output of said delay means, the second input of each output gate being connected to the output of the other output gate, the third input of each output gate being connected to a separate one of said repeater channels, and the output of both output gates being connected to said clamping means.